United States Patent [19]

Hanyu et al.

[11] Patent Number: 5,200,848
[45] Date of Patent: * Apr. 6, 1993

[54] FERROELECTRIC SMECTIC LIQUID CRYSTAL DEVICE

[75] Inventors: Yukio Hanyu; Junichiro Kanbe; Hideyuki Kawagishi; Yutaka Inaba, all of Tokyo, Japan

[73] Assignee: Canon Kabushiki Kaisha, Tokyo, Japan

[ * ] Notice: The portion of the term of this patent subsequent to Jun. 12, 2007 has been disclaimed.

[21] Appl. No.: 495,607

[22] Filed: Mar. 19, 1990

Related U.S. Application Data

[62] Division of Ser. No. 245,644, Sep. 16, 1988, Pat. No. 4,932,758.

[30] Foreign Application Priority Data

Sep. 17, 1987 [JP] Japan ................ 62-234357
Sep. 18, 1987 [JP] Japan ................ 62-232502
Sep. 7, 1988 [JP] Japan ................ 63-225049

[51] Int. Cl.$^5$ .............................. G02F 1/13
[52] U.S. Cl. ............................ 359/100; 359/78
[58] Field of Search .......... 350/350 S, 350 R, 341, 350/340; 359/100, 77, 78

[56] References Cited

U.S. PATENT DOCUMENTS 4,932,758 6/1990 Hanyu et al. ................ 350/350 S

FOREIGN PATENT DOCUMENTS 0003632 1/1989 Japan ................ 350/350 S

Primary Examiner—William L. Sikes
Assistant Examiner—Huy K. Mai
Attorney, Agent, or Firm—Fitzpatrick, Cella, Harper & Scinto

[57] ABSTRACT

A ferroelectric smectic liquid crystal device having an improved impact resistance and an improved contrast is provided by using a pair of substrates provided with uniaxial alignment axes which are parallel and identical in direction with each other. A ferroelectric smectic liquid crystal is disposed between the pair of substrates so as to assume a higher-temperature alignment state and a lower-temperature alignment state on temperature decrease in its ferroelectric smectic phase placed in a bistable alignment state. The ferroelectric smectic liquid crystal is further placed in the lower-temperature alignment state which is characterized by having an inclination of forming a connected pair of a lightning defect and a hair pin defect coming after the lightning defect.

25 Claims, 14 Drawing Sheets

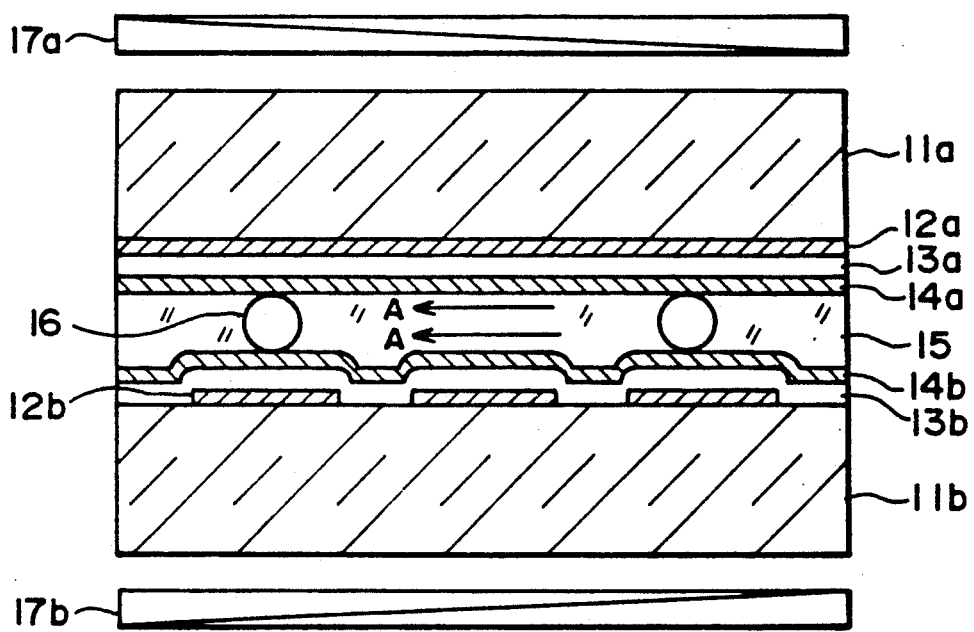
F I G. 1

X100

X100

X100

X100

X100

X50

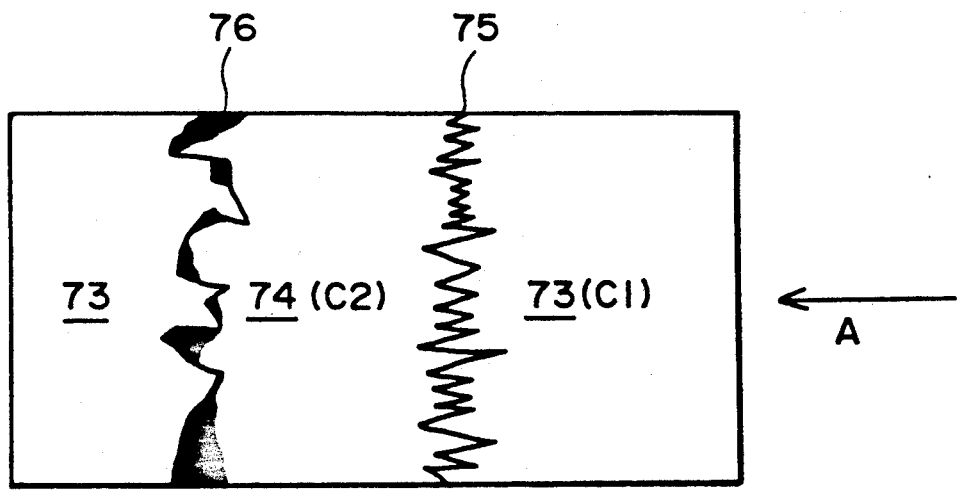
F I G. 7A
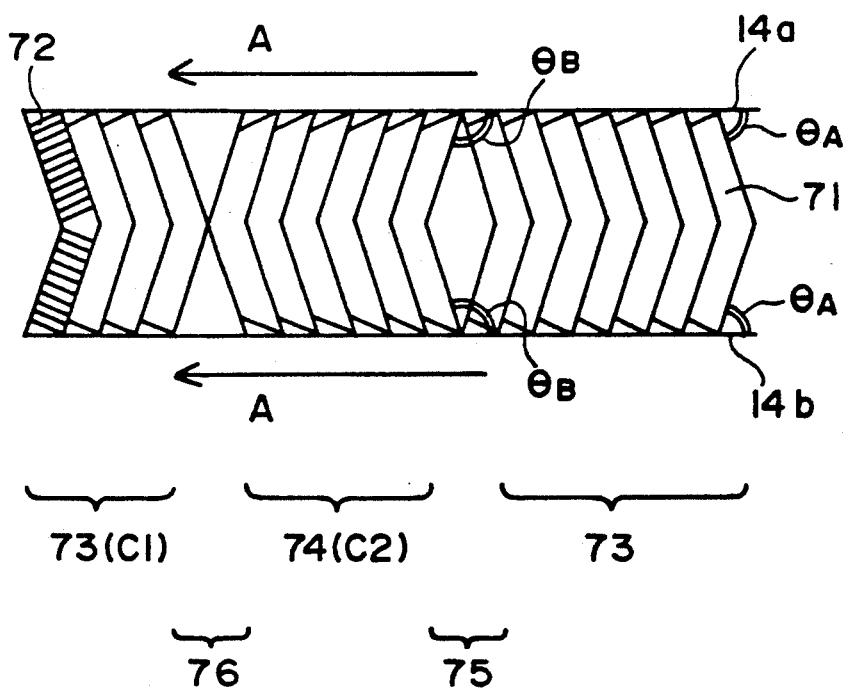
F I G. 7B

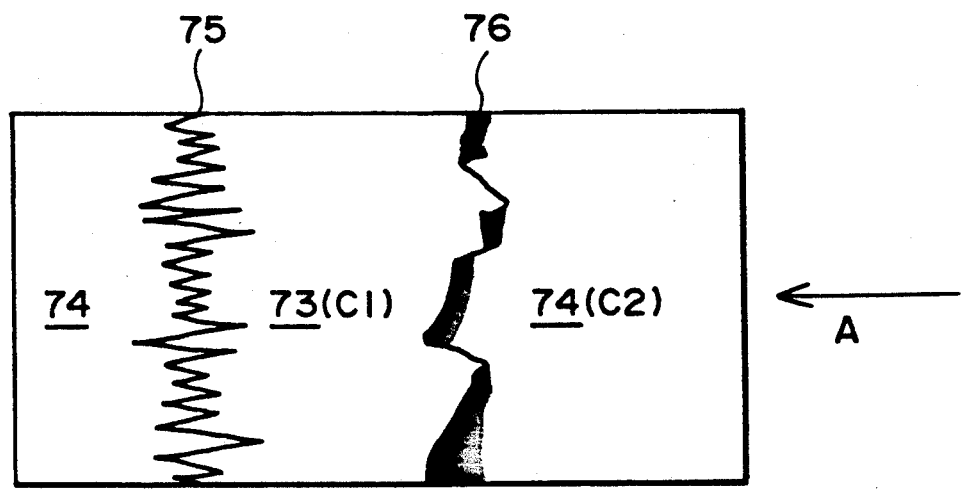
F I G. 7C
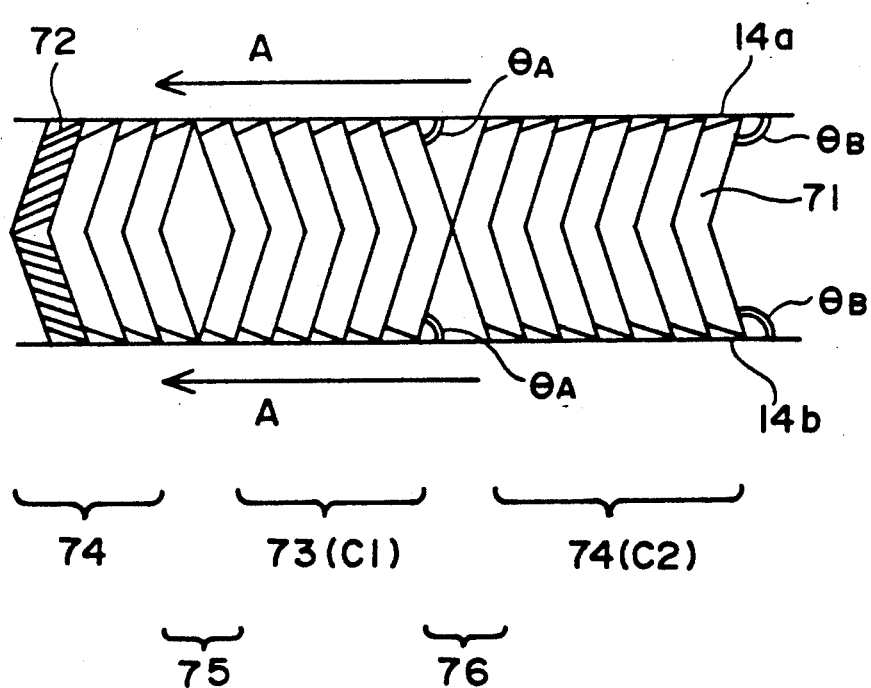
F I G. 7D

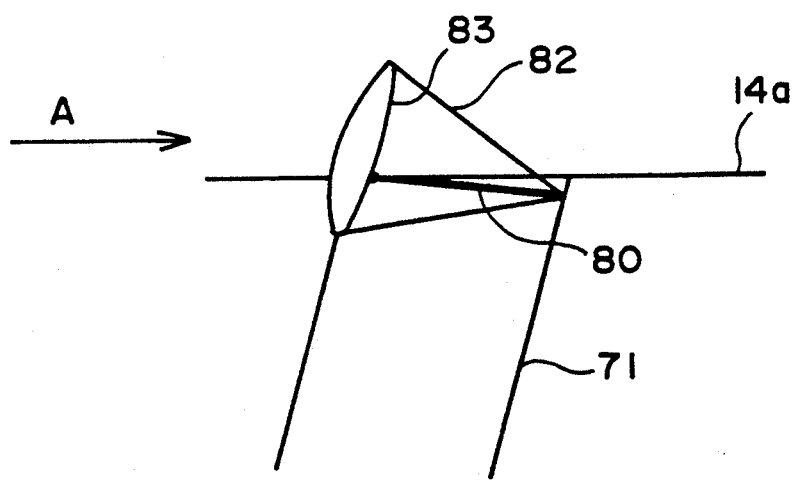
F I G. 8A
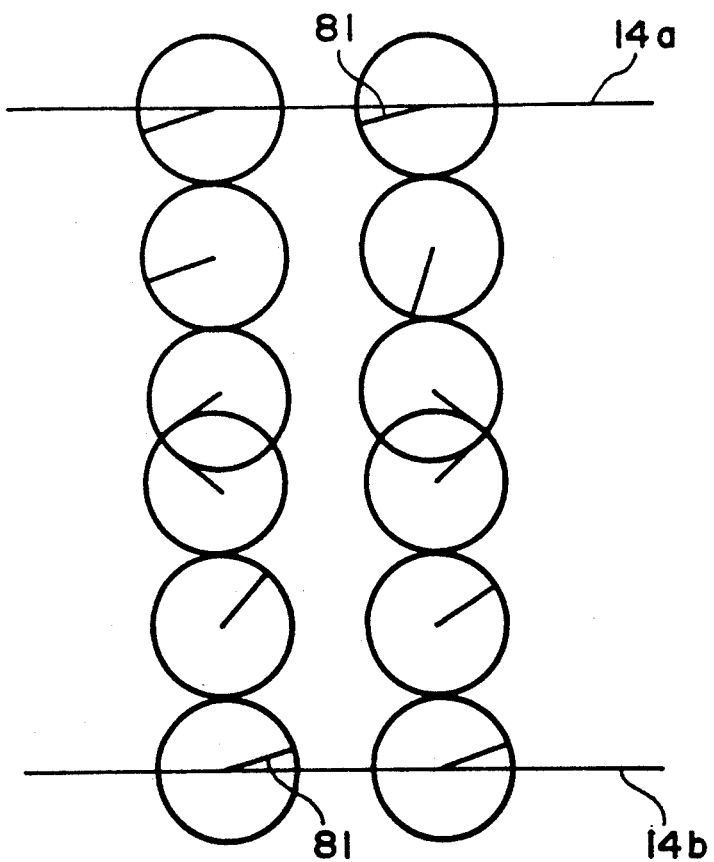
F I G. 8B

X200

X200

X200

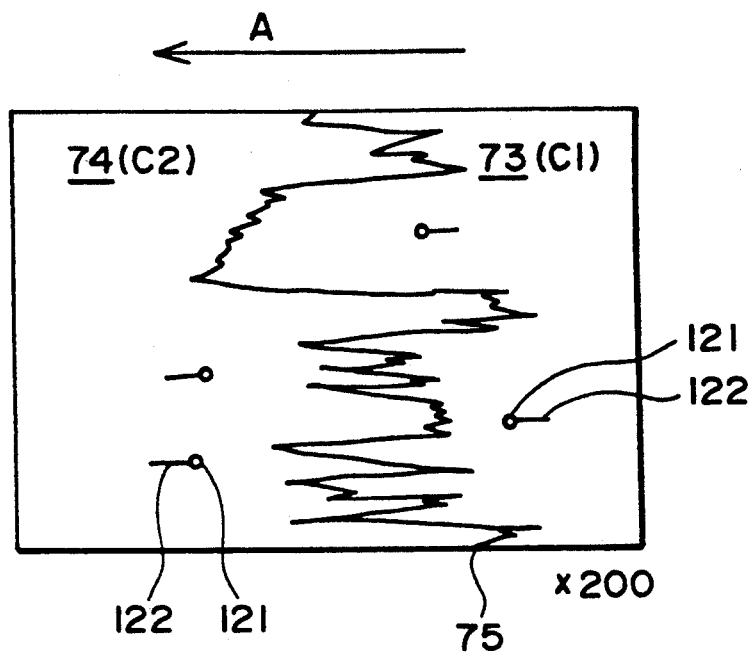
F I G. 13B
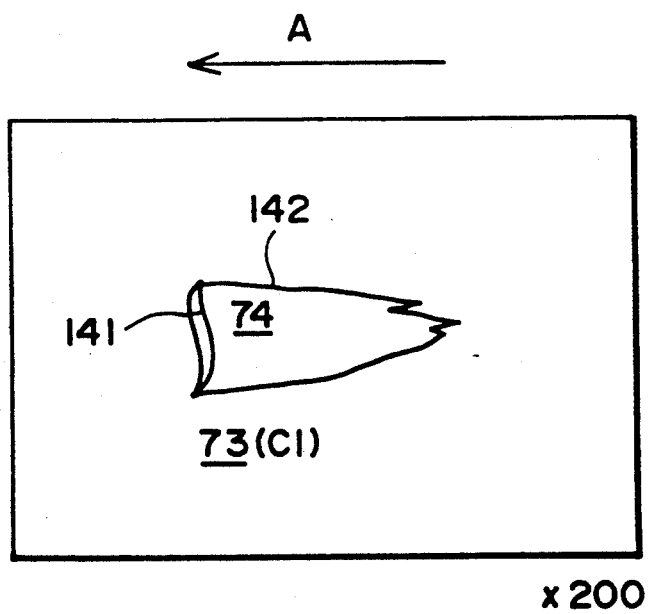
F I G. 14B

FERROELECTRIC SMECTIC LIQUID CRYSTAL DEVICE

This application is a division of application Ser. No. 245,644, filed Sept. 16, 1988 now U.S. Pat. No. 4,932,758.

FIELD OF THE INVENTION AND RELATED ART

The present invention relates to a liquid crystal device to be used in a liquid crystal display device or a liquid crystal-optical shutter, etc., particularly a liquid crystal device by use of a ferroelectric liquid crystal, more particularly to a liquid crystal device which has been remarkably improved in alignment uniformity to provide an increased contrast between the dark and bright states and also in durability of the device.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal has generally chiral smectic C phase (SmC*) or H phase (SmH*), in which it assumes a helical structure in a bulk phase. When the ferroelectric liquid crystal in such SmC* or SmH* phase is sandwiched between a pair of substrates which are disposed close enough to suppress the formation of the helical structure, it is provided with a bistable orientation or alignment state where the liquid crystal molecules assume either one of a first optically stable state and a second optically stable state in response to an applied electric field, shows a memory characteristic of retaining the resultant state in the absence of an electric field, and also shows a high-speed response to a change in electric field, so that the ferroelectric liquid crystal is expected to be widely utilized in a high speed and memory type optical modulation device.

For accomplishing the above-mentioned memory characteristic and high speed responsiveness of an optical modulation device using such a ferroelectric smectic liquid crystal placed in a bistable alignment state, it is required that the bistable alignment state is stably and uniformly retained in the device, and the device is excellent in durability and shows a high contrast between the dark and bright states.

U.S. Pat. No. 4,639,089 to S. Okada et al discloses that a ferroelectric smectic liquid crystal having a temperature range of assuming cholesteric phase is applied to a liquid crystal device provided with a uniaxial orientation axis by rubbing or oblique vapor deposition, thereby to realize a ferroelectric smectic liquid crystal device with a uniform bistable alignment state.

Such a ferroelectric smectic liquid crystal device in a uniform bistable alignment state realized through rubbing or oblique vapor deposition is liable to provide a lower transmittance in the bright memory state than the one taught by N. A. Clark, et. al.

The above-mentioned ferroelectric smectic liquid crystal in the ferroelectric smectic liquid crystal device comprises liquid crystal molecules aligned in a high degree of order because of its uniform alignment state. Such an alignment state in a high degree of order is rather sensitive to a stress from outside the cell (device), such as impact or distortion, and causes a disorder in liquid crystal molecular alignment, typically occurrence of a sanded texture, when subjected to such a stress. The occurrence of a sanded texture by application of an impact is disclosed by U.S. Pat. No. 4,674,839 to A. Tsuboyama et al.

SUMMARY OF THE INVENTION

It is therefore an object of the present invention to provide a ferroelectric smectic liquid crystal device in a uniform bistable alignment state, which shows a high stability against an impact or distortion.

Another object of the present invention is to provide a ferroelectric smectic liquid crystal device in a uniform bistable alignment state, which provides a large contrast between the bright and dark states.

Through an repetitive experiments and microscopic examination, we have succeeded in stably providing such an alignment state in which the ferroelectric liquid crystal molecules are disposed in a bistable alignment state showing a high degree of alignment order through a uniaxial aligning treatment such as rubbing or oblique vapor deposition and which is highly resistant to the stress from outside the cell.

More specifically, according to the present invention, there is provided a ferroelectric smectic liquid crystal device, comprising:
 a) a pair of substrates each provided with a uniaxial alignment axis;
 b) a ferroelectric smectic liquid crystal disposed between the pair of substrates and capable of forming a higher-temperature alignment state or subphase and a lower-temperature alignment state or subphase in its ferroelectric smectic phase placed in a bistable alignment state providing two stable orientation states, said ferroelectric smectic liquid crystal being further placed in the lower-temperature alignment state; and
 c) means for optically discriminating the two stable orientation states.

The lower-temperature alignment state is related with the uniaxial alignment axes provided to a pair of substrates.

Thus, according to another aspect of the present invention, there is provided a ferroelectric smectic liquid crystal device, comprising:
 a) a pair of substrates each provided with a uniaxial alignment axis, the alignment axes on the pair of substrates being substantially parallel with each other (crossing angle of less than 30 degrees) and having an identical axis direction;
 b) a ferroelectric smectic liquid crystal disposed between the pair of substrates in a bistable alignment state providing two stable orientation states having an inclination of forming a connected pair of a hair pin defect and a lightning defect and further in such an alignment state that the hair pin defect is formed after the lightning defect in the uniaxial alignment axis direction; and
 c) means for optically discriminating the two stable orientation states.

These and other objects, features and advantages of the present invention will become more apparent upon a consideration of the following description of the preferred embodiments of the present invention taken in conjunction with the accompanying drawings, wherein like reference numerals denote like parts.

BRIEF DESCRIPTION OF THE DRAWINGS

FIG. 1 is a schematic sectional view of a liquid crystal device according to the invention;

FIGS. 2A-6A are microscopic photographs showing alignment states of a ferroelectric liquid crystal varying depending on temperature; FIGS. 2B-6B are sketches for illustration based on FIGS. 2A-6A;

FIG. 7A is a schematic plan view showing a C1 alignment domain and a C2 alignment domain, and FIG. 7B is a corresponding sectional view across the thickness; FIG. 7C is another schematic plan view showing a C1 alignment domain and a C2 alignment domain, and FIG. 7D is a corresponding sectional view across the thickness;

FIG. 8A is a schematic view illustrating a C1 alignment; FIG. 8B is a view showing a projection of C-directors corresponding thereto;

FIGS. 11A-14A are microscopic photographs showing C1 and C2 alignment domains; FIGS. 11B-14B are sketches for illustration based on FIGS. 11A-14A;

DESCRIPTION OF THE PREFERRED EMBODIMENTS

Figure 2A:
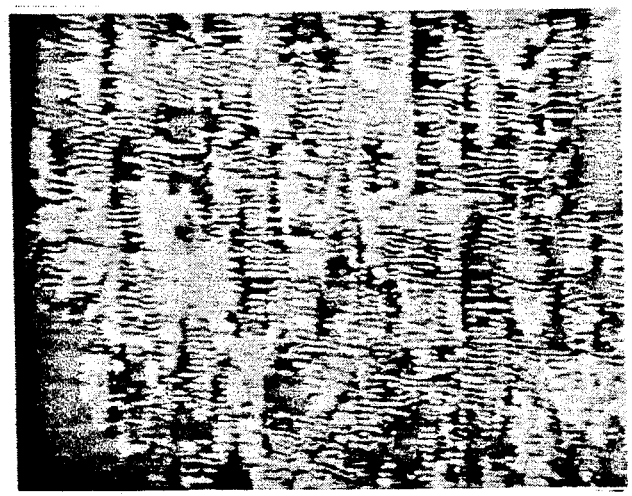

FIG. 1 is a schematic partial sectional view of a ferroelectric smectic liquid crystal device according to the present invention.

The liquid crystal device comprises substrates (glass plates) 11a and 11b coated with transparent electrodes 12a and 12b, respectively, of $In_2O_3$, ITO (indium tin oxide), etc., which are further coated with insulating films 13a and 13b, respectively, of e.g., 200 Å to 1000 Å-thick films of $SiO_2$, $TiO_2$, $Ta_2O_5$, etc., and then with alignment control films 14a and 14b, respectively, of e.g., 50 Å to 1000 Å-thick films of polyimide, polyamide, polyester, etc. The alignment control films 14a and 14b have been subjected to rubbing in the directions of arrows A which are parallel with each other and identical in direction. A ferroelectric smectic liquid crystal 15 is disposed between the substrates 11a and 11b which are spaced from each other with a spacing (e.g., 0.1-3 microns) sufficiently small to suppress the formation of the helical structure of the ferroelectric smectic liquid crystal 15, so that the ferroelectric smectic liquid crystal 15 is placed in a bistable alignment state providing two stable orientation states. The sufficiently small spacing may be held by spacer beads 16 (silica beads, alumina beads, etc.).

The thus formed cell structure is sandwiched between a pair of polarizers 17a and 17b arranged in cross nicols for optically discriminating the two stable orientation states of the liquid crystal molecules.

According to our experiments as will be explained hereinafter based on examples, it has been found possible, by selecting a liquid crystal material, alignment control films and the direction of uniaxial alignment axes provided to the pair of substrates, to provide different bistable alignment states on a higher temperature side and a lower temperature side in the temperature range of chiral smectic C phase, of which the bistable alignment state on the lower temperature side is highly resistant to impact or distortion and provides a large contrast between the black and dark states. In the lower-temperature bistable alignment state, the ferroelectric smectic liquid crystal has an inclination of forming a connected pair of a lightning defect and a hair pin defect in which the lightning defect comes after the hair pin defect in the rubbing direction commonly provided to the pair of substrates. In contrast thereto, in the higher-temperature bistable alignment state, the ferroelectric smectic liquid crystal has an inclination of forming a connected pair of a lightning defect and a hair pin defect in which the hair pin defect comes after the lightning defect in the rubbing direction. For convenience, in the chiral smectic C phase temperature range, the above-mentioned higher-temperature alignment state is referred to as C1 alignment or C1 sub-phase and the lower-temperature alignment state is referred to as C2 alignment state or C2 sub-phase.

FIGS. 2A-6A are microscopic photographs (magnification of 100) of alignment states of a 1 cm × 1 cm test ferroelectric smectic liquid crystal cell at various temperatures observed through right angle cross nicols respectively arranged to provide the darkest condition of the dark state (i.e., extinction position). FIGS. 2B-6B are sketches based on FIGS. 2A-6A, respectively.

Figure 4A:
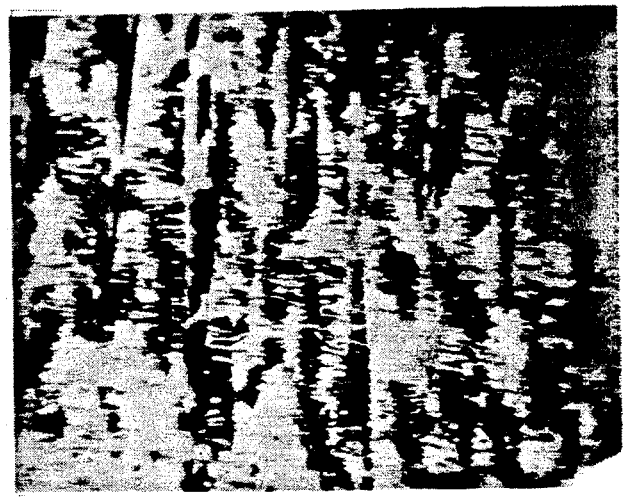
Figure 4B:
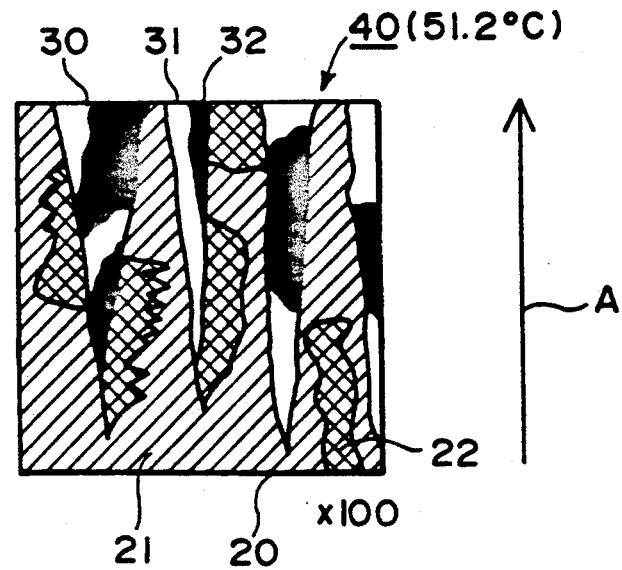
Figure 5A:
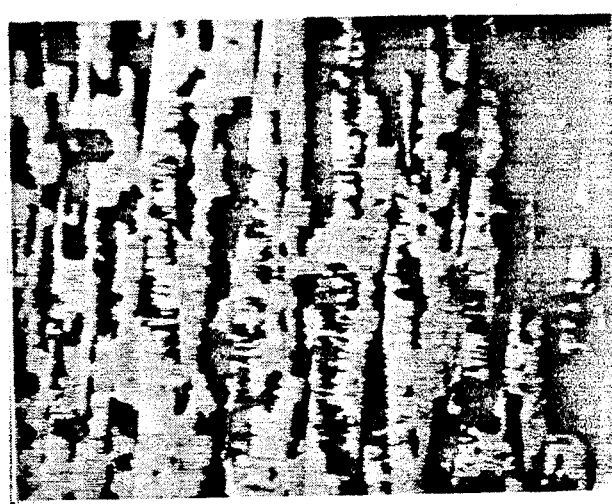
Figure 6A:
Figure 6B:
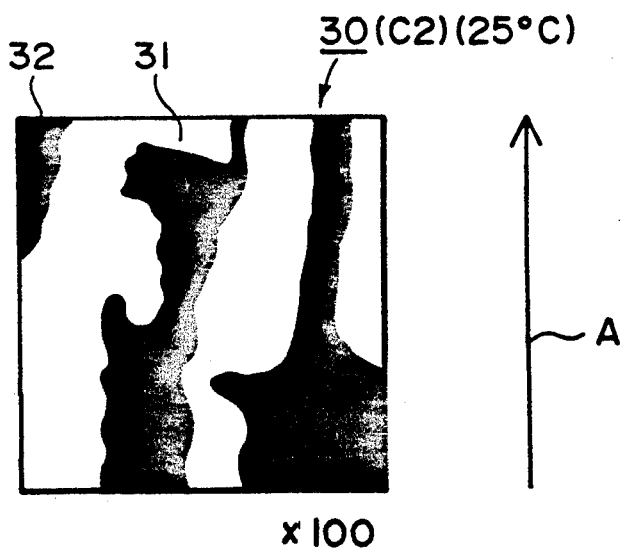

Referring to FIGS. 2B-6B, FIG. 2B shows a C1 alignment state, FIG. 6B shows a C2 alignment state, and FIGS. 3B-5B shows states where a C1 alignment state and a C2 alignment state are in mixture (hereinafter called "C1/C2 mixture alignment"). According to our observation, a C1 domain shown in FIGS. 2-5 occupied a substantial area even macroscopically (i.e., according to naked eye observation).

For preparing the cell, the liquid crystal used was a ferroelectric smectic liquid crystal "CS-1014" (trade name, available from Chisso K. K.). The alignment film was formed by using an alicyclic polyimide film-forming liquid "SUN-EVER 150" (trade name, available from Nissan Kagaku Kogyo K. K.). The pair of substrates were provided with rubbing axes which were in parallel with each other and identical in direction. (The details of the production of the cell are the same as those given in Example 1 appearing hereinafter except for the cell size and the absence of spacer beads.) The liquid crystal in the cell showed the following phase transition characteristic (the numbers indicated on the arrows denote phase transition temperatures in °C.):

$$Iso \xrightarrow{80.5} Ch \xrightarrow{69.1} SmA \xrightarrow{54} Sm^*C1 \xrightarrow{51.4}$$

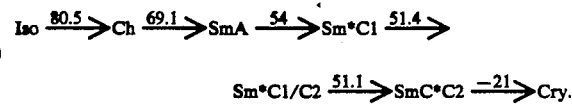

Iso: isotropic phase,
Ch: cholesteric phase,
SmA: smectic A phase,
Sm*C1: chiral smectic C phase showing C1 sub-phase
Sm*C1/C2: chiral smectic C phase showing a mixture of C1 and C2 sub-phases
Sm*C2: chiral smectic C phase showing C2 sub-phase Cry: crystal phase.

The Iso-Ch phase phase transition temperature, Ch-SmA phase transition temperature, SmA-, Sm*C1 phase transition temperature and Sm*C2-Cry. phase transition temperature were measured by a temperature controller "FP800" (trade name, available from Mettler Instrument AG, Switzerland). The Sm*C1 - Sm*C1/C2 phase transition temperature and Sm*C1/C2 - Sm*C2 phase transition temperature were determined through microscopic observation on temperature decrease.

Figure 3A:
Figure 2B:
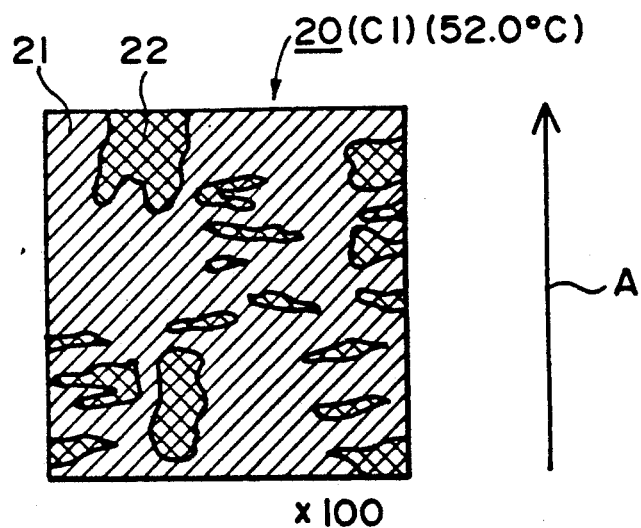
Figure 3B:
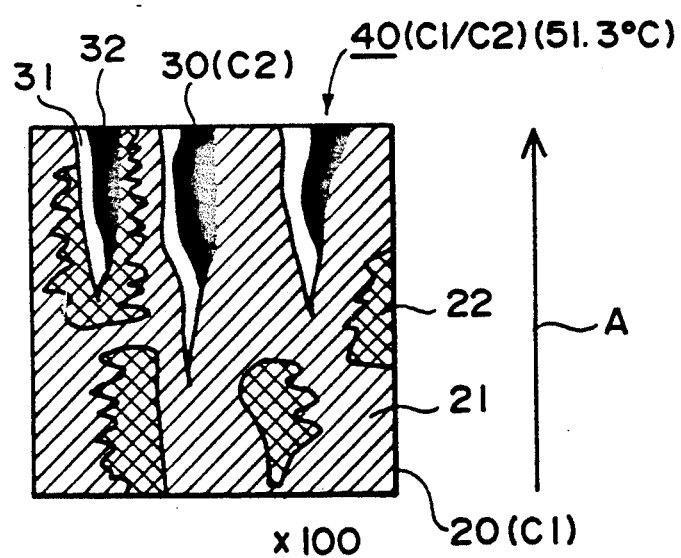

FIG. 2 (FIG. 2A or 2B) shows the extinction state (the state given by the extinction position of right angle cross nicols providing the darkest condition of the dark state) of a C1 alignment domain 20 at 52.0° C., which is bluish including a blue bright state 21 and a blue dark state 22. FIG. 6 (FIG. 6A or 6B) shows a blackish extinction state of a C2 alignment domain 30 at 25° C. including a white bright state 31 and a black dark state 32. FIGS. 3 to 5 respectively show a mixture domain 40 including a bluish extinction state of a C1 alignment domain 20 and a blackish extinction state of a C2 alignment domain 30 at 51.3° C., 51.2° C. and 51.1° C., respectively. Further, the C1 alignment domain 20, the C2 alignment domain and the C1/C2 mixture domain were respectively supplied with a pulse of 50 μsec and +30 V while retaining their states and observed with respect to their extinction states. As a result, the C1 alignment domain 20 provided a blue extinction state and the C2 alignment domain provided a black extinction state. Further, the C1 alignment domain 20, the C2 alignment domain 30 and the C1/C2 mixture domain 40 were then supplied with an inversion pulse of 50 μsec and −30 V and then observed with respect to their extinction states. As a result, the C1 alignment domain 20 provided a blue extinction state and the C2 alignment domain 30 provided a black extinction state, again.

As described above, the cell provided a C1 alignment domain or sub-phase 20 and a C2 alignment domain or sub-phase 30, which are different from each other, in the temperature range of chiral smectic C phase. As the temperature was lowered, the C2 alignment domain 30 was gradually grown to occupy a major areal proportion (60% or more, preferably 90% or more) and the C1 alignment domain 20 shrinked correspondingly to occupy a minor areal proportion (40% or less, preferably 10% or less) until it reached a macroscopically or substantially negligible except for a minor portion in the vicinity of the cell periphery as is shown in FIGS. 3 to 5. Further, FIGS. 3 to 6 show that the C2 alignment domain 30 was grown from the C1 alignment domain 20 shown in FIG. 2 and through the C1/C2 mixture alignment domains 40 shown in FIGS. 3–5). Further, as will be clarified in Examples appearing hereinafter, it has been found that a ferroelectric smectic liquid crystal device placed in a bistable alignment state in such a lower-temperature C2 sub-phase or alignment state substantially occupied by the C2 alignment domain 30, is remarkably more resistant to an external impact or distortion and provides a larger contrast between the dark and bright states than a device placed in a higher-temperature C1 sub-phase and a device placed in a conventional bistable alignment state formed by providing a pair of substrates with rubbing axes which are parallel with each other but are reverse in direction.

The characteristics of the C1 and C2 subphases or domains will now be explained with reference to drawings. FIGS. 7A and 7B are a partial schematic plan view and a corresponding sectional view, respectively, showing a hair pin defect and a lightning defect formed in a generally C1 alignment domain. FIGS. 7C and 7D are a partial schematic plan view and a corresponding sectional view, respectively, showing a hair pin defect and a lightning defect formed in a generally C2 alignment domain.

Referring to FIGS. 7B and 7D, in a gap between a pair of alignment control films 14a and 14b each provided with a common rubbing direction A, there are formed a plurality of liquid crystal molecular layers 71 each composed of a plurality liquid crystal molecules in chiral smectic C phase. The liquid crystal molecular layers 71 constitute domains of different alignment states including a C1 alignment domain 73 and a C2 alignment domain.

As shown in FIGS. 7B and 7D, a molecular layer 71 constituting a C1 alignment domain 73 is inclined to form an acute angle $\theta_A$ with respect to the upper and lower alignment control films 14a and 14b in the neighborhood of the films. On the other hand, a molecular layer 71 constituting a C2 alignment domain 74 is inclined to form an obtuse angle.

A large size of lightning defect 75 and a large size of hair pin defect 76 are each formed at a boundary between a C1 alignment domain 73 and a C2 alignment domain 74.

Further, when a cell containing a C1 alignment domain 20 as shown in FIG. 2 is subjected to a distortion, a C2 alignment domain is found at the distorted portion, thus forming boundary between a C2 alignment domain and a C1 alignment domain so that a hair pin defect and a lightning defect occur.

Figure 9A:
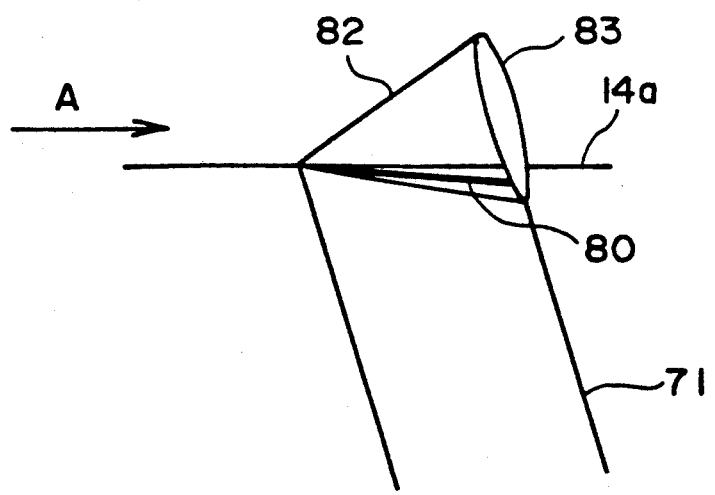
FIG. 9A is a schematic view illustrating a C2 alignment.
Figure 9B:
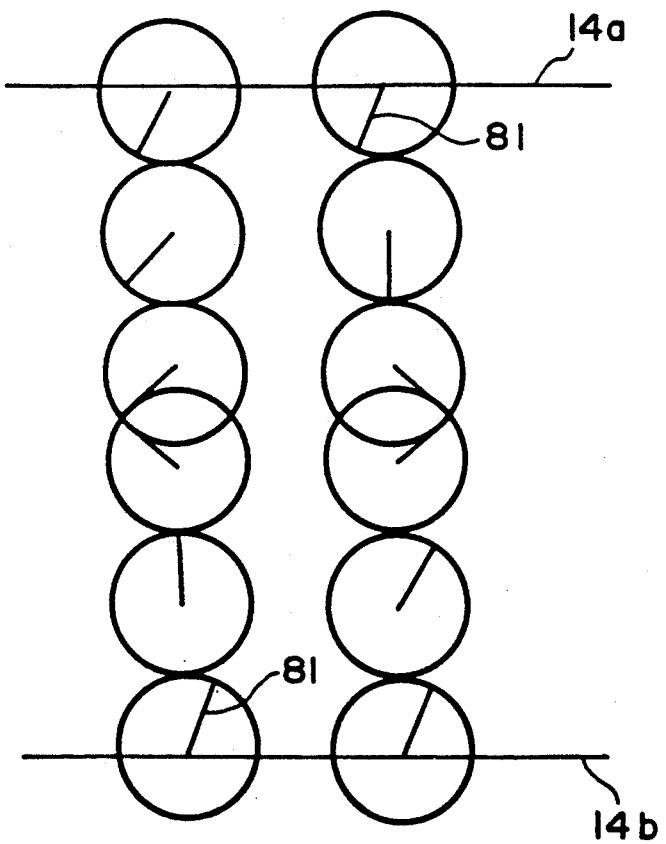
FIG. 9B is a view showing a projections of C-directors corresponding thereto.

FIG. 8A is an enlarged view illustrating a molecular layer 71 and a liquid crystal molecule 80 disposed on a helical cone 82 having a base 83 in a C1 alignment state. FIG. 8B shows a typical pair of twisting arrangement of C-director 81 (the projection of a molecular long axis 80 on a hypothetical plane (corresponding to the base 83) which is perpendicular to a normal to the molecular layer 71) oriented in a C1 alignment state between the alignment control films 14a and 14b. FIG. 9A is an enlarged view illustrating a molecular layer 71 and a liquid crystal molecule 80 in a C2 alignment state. FIG. 9B shows a typical pair of twisting arrangements of C director 81 oriented in a C2 alignment state. Molecular long axes 80 in a molecular layer 71 are arranged while changing their positions on the bases 83 (circles) of cones 82 between the interface with the upper alignment control film 14a and the interface with the lower alignment control film 14b. The right half arrangement and the left half arrangement of each of FIGS. 8B and 9B correspond to orientation states after application of a positive (or negative) polarity pulse and a negative (or positive) polarity pulse.

Figure 10A:
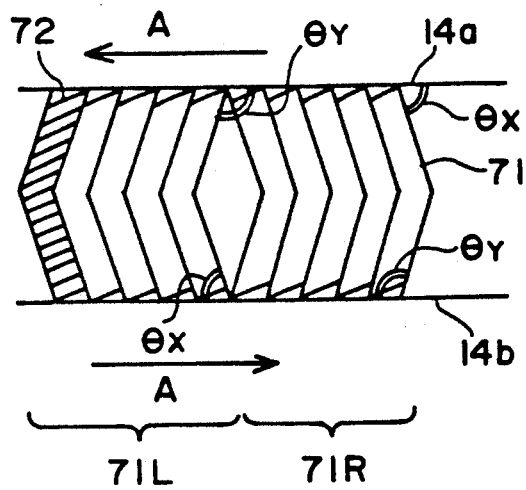
FIG. 10A is a schematic view illustrating an alignment state in a conventional device.
Figures 10B, 10C:
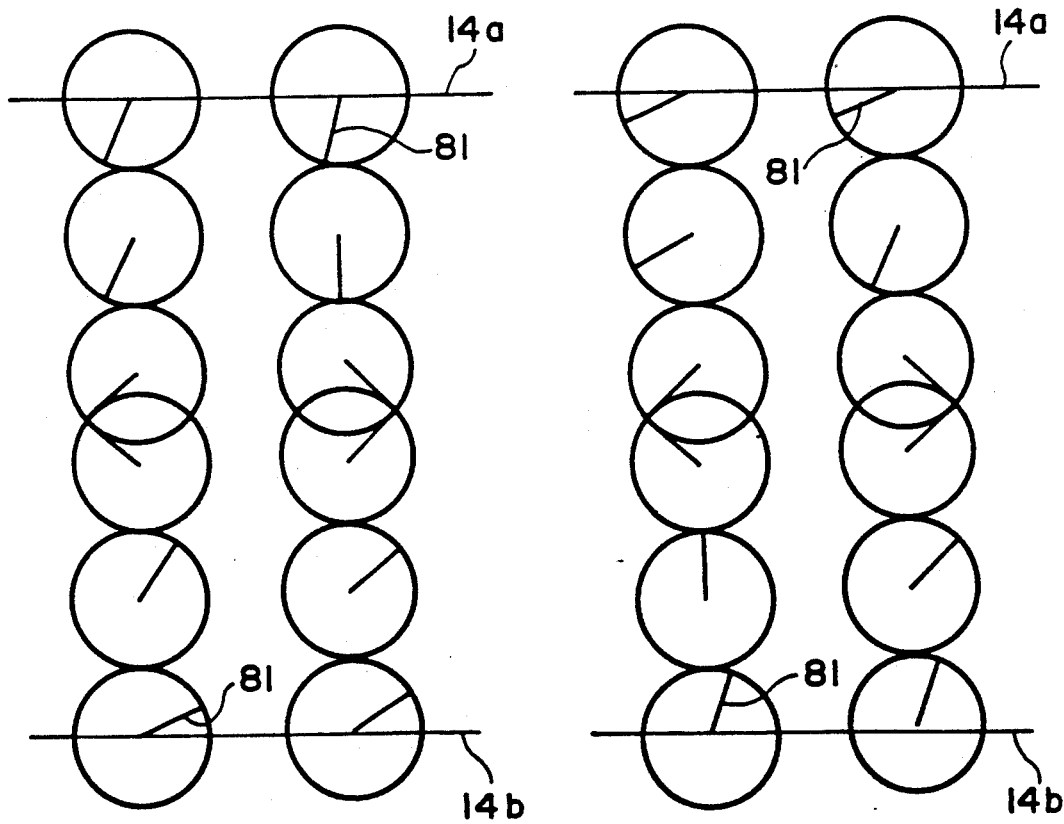
FIGS. 10B and 10C are views showing projections of C-directors corresponding thereto.

FIGS. 10A–10C illustrate an alignment state formed between a pair of alignment states 14a and 14b provided with rubbing axes A which are parallel with each other but are reverse in direction. More specifically, FIG. 10A shows a plurality of liquid crystal molecular layers 71 each composed of a plurality of liquid crystal molecules in chiral smectic C phase. The liquid crystal molecular layers 71 constitute domains of different alignment states. In the alignment state shown in FIG. 10A, with respect to the rubbing direction A provided to the upper alignment control film 14a, molecular layers 71R shown on the right side are inclined to form an acute angle $\theta x$ and molecular layer 71L shown on the left side are inclined to form an obtuse angle $\theta y$, respectively in the neighborhood of the alignment control film 14a. On the other hand, with respect to the rubbing direction A provided to the lower alignment control film 14b, the right-side molecular layers 71R are inclined to form an obtuse angle $\theta y$ and the left-side molecular layers 71L are inclined to form an acute angle $\theta x$, respectively in the neighborhood of the lower alignment control film 14b. In other words, each of the molecular layers 71R and 71L form an inclination at an acute angle $\theta x$ and an obtuse angle $\theta y$ in the neighborhood of the upper and lower alignment films. Twisting arrangements of C-directors in these alignments states are shown in FIGS. 10B and 10C. FIG. 10B shows twisting of C-directors 81 in a molecular layer 71L in which the right and left arrangements correspond to orientation states formed after application of a positive (or negative) polarity pulse and a negative (or positive) polarity pulse, respectively. Further, FIG. 10C shows twisting of C-directors 81 in a molecular layer 71R, in which the right and left arrangements correspond to orientation states formed after application of a positive (or negative) polarity pulse and a negative (or positive) polarity pulse, respectively.

In contrast thereto, in FIG. 7, a molecular layer 71 forms an acute inclination angle $\theta_A$ on both the upper and lower alignment control films in the C1 alignment domain 73, and an obtuse angle $\theta_B$ on both the upper and lower alignment control films in the C2 alignment domain 74.

Further, the C-director arrangement corresponding to the C1 alignment state (shown in FIG. 8B) and the C-director arrangement corresponding to the C2 alignment state (shown in FIG. 9B) are not symmetrical with each other. In contrast thereto, the C-director arrangements shown in FIGS. 10B and 10C corresponding to the molecular layers 71R and 71L, respectively, shown in FIG. 10A are mutually optical equivalent and are symmetrical with each other.

Figure 11A:
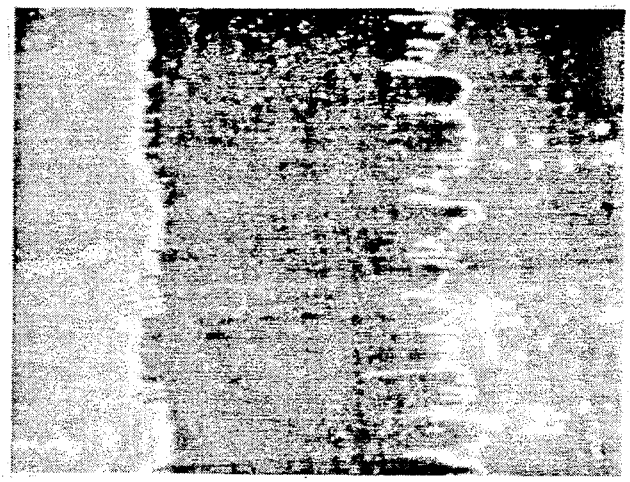
Figure 5B:
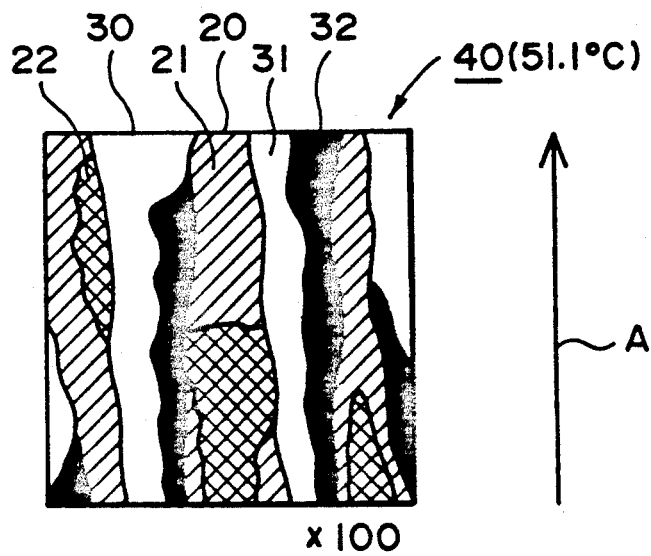
Figure 12A:
Figure 13A:
Figure 14A:
Figure 11B:
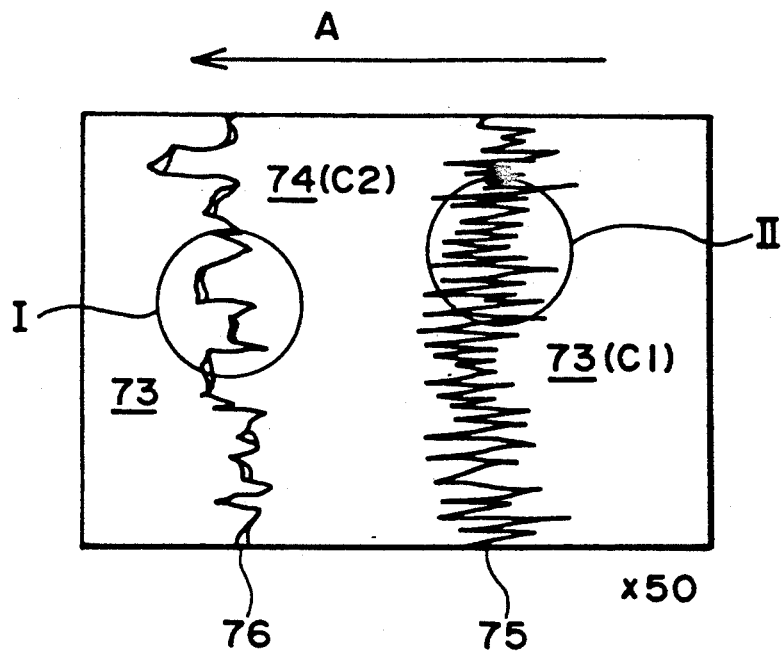
Figure 12B:
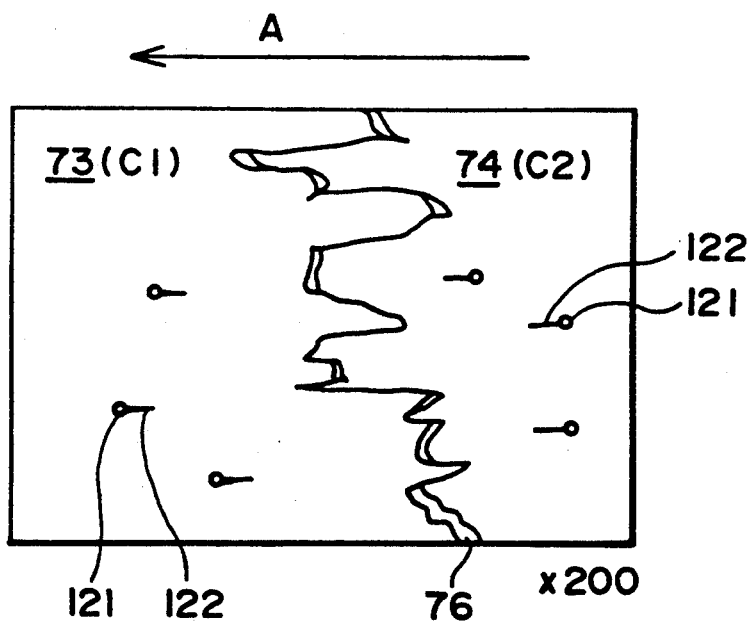

FIG. 11A is a microscopic photograph (×50) of an alignment state wholly switched to the dark state corresponding to FIG. 7A) in a ferroelectric smectic liquid crystal cell (described in Example 1 appearing hereinafter) observed through right angle cross nicols arranged in the extinction position (at 51.3° C.), and FIG. 11B is a sketch based on FIG. 11A. FIGS. 12A and 13A are microscopic photographs (×200) providing enlarged views of regions I and II; respectively, indicated in FIG. 11B, observed through right angle cross nicols arranged at a position shiftly deviated from the extinction position so as to provide a generally blackish view, and FIGS. 12B and 13B are sketches based thereon. FIG. 14A is a microscopic photograph (×200) of a C1 alignment domain formed in the same cell as FIG. 11A wherein a C2 alignment domain was generated by distortion, observed through right angle cross nicols at a position slightly deviated from the extinction position. FIG. 14B is a sketch based on FIG. 14A.

In the alignment state shown in FIG. 11 (11A or 11B), a C1 alignment domain 73 and a C2 alignment domain 74 are co-present, and at boundaries therebetween, a lightning defect 75 and a hair pin defect 76 occur. As shown in FIG. 11B, when a C2 alignment domain 74 is formed surrounded by a C1 alignment domain 73, a lightning defect 75 occurs at a boundary changing from the c1 alignment domain 73 to the C2 alignment domain 74 in the rubbing direction A, and a hair pin defect 76 occurs at a boundary changing from the C2 alignment domain 74 to the C1 alignment domain 73 in the rubbing direction A.

According to the present invention, as shown in FIGS. 2 to 6, a C2 alignment domain 74 can be developed so as to occupy an almost entire region in the course of temperature decrease by appropriate selection of a liquid crystal material, alignment control films and rubbing directions applied thereto. In a preferred embodiment of the present invention, a C1 alignment domain 73 may be formed at only cell peripheral portions (e.g., in the neighborhood of a sealing member for sealing the cell) and a C2 alignment domain may be developed in a major central portion surrounded by the peripheral portions.

FIG. 12 (12A and 12B) shows connected pairs of a small hair pin defect 121 and a small lightning defect 122 generated due to the presence of spacer beads (of alumina or silica in an average diameter of about 1.5 microns) respectively in a C1 alignment domain 73 and a C2 alignment domain 74 formed with a hair pin defect 76 at the boundary therebetween. As shown in FIG. 12, in the C2 alignment domain 74, a connected pair of a hair pin defect 121 and a lightning defect 122 is so generated that the hair pin defect 121 comes after the lightning defect 122 in the rubbing direction A. To the contrary, in the C1 alignment domain 73, a lightning defect 122 comes after a hair pin defect in a connected pair in the rubbing direction A.

FIG. 13 (FIG. 13A or 13B) shows connected pairs of a hair pin defect 121 and a lightning defect 122 generated in a C1 alignment domain 73 and a C2 alignment domain 74 formed with a lightning defect 75 at the boundary therebetween. According to FIG. 13, it will be found that the connected pairs are generated in the same generation or arrangement orders in the C1 and C2 alignment domains 73 and 74 respectively as those explained with reference to FIG. 12.

FIG. 14 (FIG. 14A or FIG. 14B) shows a C2 alignment domain 74 generated by distortion in a C1 alignment domain 73. In this instance, a pair of hair pin defect 141 and a lightning defect 142 is formed around the C2 alignment domain in such a manner that the lightning defect 142 comes after the hair pin defect 141.

According to our observation, a hair pin defect is generated in a width of generally several microns, while a lightning defect is generated in a zigzag manner with a line width of generally below 1 micron.

Further, according to our experiments, when a C1 alignment domain 73 is supplied with a distortion, a C2 alignment domain 74 is formed in the C1 alignment domain 73 as shown in FIG. 14, and the thus formed C2 alignment domain stably remains for a long period of time. In contrast thereto, when a C2 alignment domain is supplied with a distortion, a C1 alignment domain 73 is generated in the C2 alignment domain 74, but the C1 alignment domain 73 disappears instantaneously. From this fact, it is understood that a C2 alignment domain is stabler than a C1 alignment state and has a property of being instantaneously restored to the original alignment state even if it is subjected to an external stress. In contrast thereto, a C1 alignment domain 73 is fragile to an external stress. Further, as will be understood from FIG. 11A, a C2 alignment domain 74 provides a transmittance which is remarkably smaller than that of a C1 alignment domain 73 respectively at the extinction position.

According to the present invention, it is possible to form a C2 alignment domain wherein a hair pin defect is placed after a lightning defect in a connected pair in the uniaxial alignment axis direction alignment domain occupies a major portion (60% or more, preferably 90% or more) of the entire region of the cell until the C1 alignment domain becomes substantially or macroscopically negligible except for the peripheral portion of the cell. A ferroelectric smectic liquid crystal to be used in the present invention is not particularly limited per se but is restricted by a correlation with an alignment control film, so that a preferable combination of a ferroelectric smectic liquid crystal and an alignment control film should be selected. In a preferred embodiment of the present invention, it is possible to use a chiral smectic liquid crystal having temperature ranges for assuming cholesteric phase and smectic A phase in the course of temperature decrease.

In an embodiment of the present invention, a temperature range for providing a C1 alignment state wherein a lightning defect is formed after a hair pin defect, may be restricted to 1/5 or below, preferably 1/10 or below, further preferably 1/20 or below, of a temperature range for providing a C2 alignment state wherein a hair pin defect is formed after a lightning defect, respectively in the direction of a uniaxial alignment axis. Further, the lower temperature limit in the course of temperature decrease for allowing the presence of the C1 alignment state or domain in a substantial proportion (40% or above, preferably 10% or above) should be 30° C. or higher, preferably 40° C. or higher.

According to our experiments, it has been further found that, when a ferroelectric smectic liquid crystal cell in a bistable alignment state is formed by gradual cooling through smectic A phase in a cell subjected to a uniaxial aligning treatment such as rubbing, such a ferroelectric smectic liquid crystal cell obtained through smectic A phase giving a pre-tilt angle of 2 degrees or larger, preferably 3 degrees or larger, provides an improved contrast. It has been also found that an improved contrast is obtained when liquid crystal molecules are aligned in a bend alignment state in smectic A phase.

Figure 17:
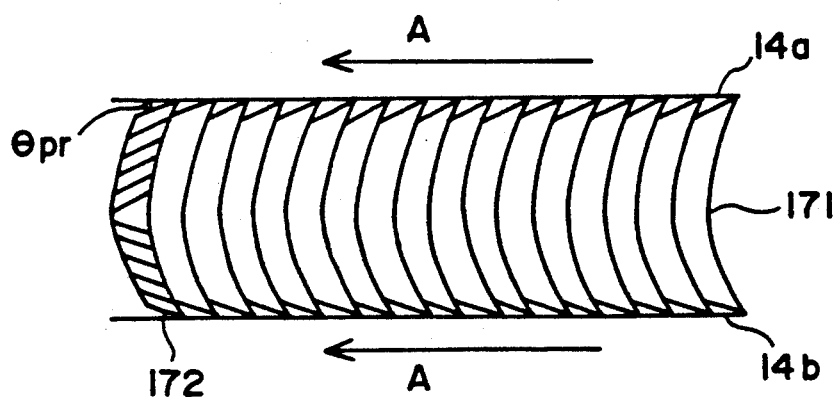
FIG. 17 is a schematic sectional view across the thickness of a cell illustrating a bend alignment state in smectic A phase.

FIG. 17 is a schematic sectional view across the thickness of a cell illustrating the above-mentioned bend alignment state in smectic A phase. The cell comprises a plurality of molecular layers 171 each composed of a plurality of liquid crystal molecules 172 in smectic A phase. Each molecular layer in smectic A phase is in a warped or bent state, wherein a liquid crystal molecule is aligned to provide a pretilt angle θpr of 2 degrees or larger, preferably 3 degrees or larger. The pretilt angle θpr may be measured by a method described in G. Baur, V. Wittwer & D. W. Berreman, "Physical Letter", No. 56A, p. 142 (1976).

In the above explanation, explanation has been generally made based on embodiments wherein rubbing is used as a uniaxial aligning treatment. In the present invention, however, it is possible to use uniaxial alignment axis given by oblique vapor deposition. In this case, the axial direction of the oblique vapor deposition is determined by correlation with that of the rubbing axis giving the same direction of a pretilt angle θpr in smectic A phase as shown in FIG. 17. More specifically, the uniaxial alignment axis direction may be referred to as the direction of the projection on a substrate concerned of the rising inclination direction of a liquid crystal molecule long-axis forming a pretilt angle with respect to the substrate.

Figure 15:
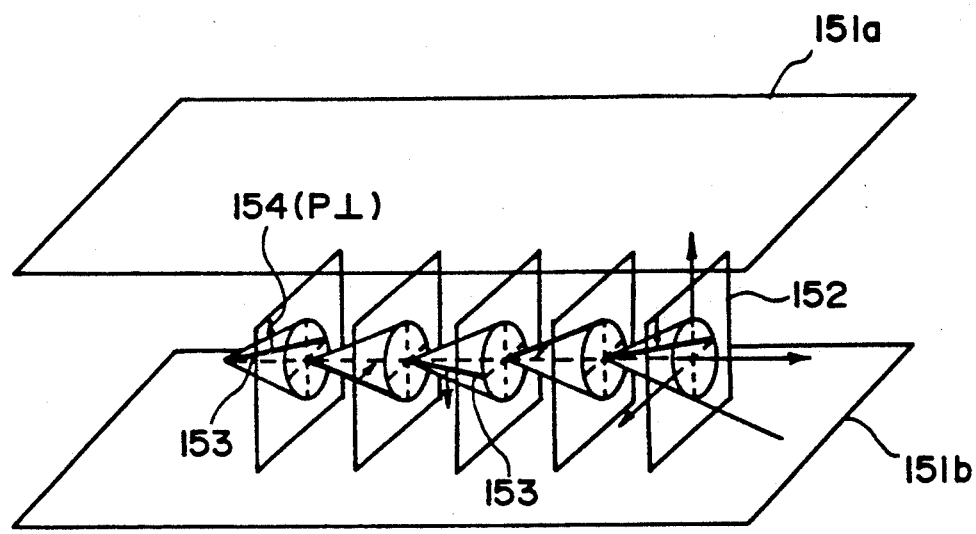
FIG. 15 is a schematic perspective view for illustrating an operation of a ferroelectric liquid crystal device.

Now, explanation of the operation principle of a ferroelectric smectic liquid crystal cell is supplemented to some extent. FIG. 15 illustrates schematically an example of a ferroelectric liquid crystal cell for explanation. Substrates (glass plates) 151a and 151b are coated with transparent electrodes of $In_2O_3$, $SnO_2$ or ITO (Indium Tin Oxide), etc., and a liquid crystal of SmC* (chiral smectic C phase) or SmH* (chiral smectic H phase) is hermetically disposed therebetween so that a plurality of liquid crystal molecular layers 152 are aligned perpendicular to the glass substrates. Full lines 153 represent liquid crystal molecules each having a dipole moment (P⊥) 154. When a voltage above a certain threshold value is applied between the electrodes on the substrates 151a and 151b, the helical structure of the liquid crystal molecules 153 is unwound or released to orient the liquid crystal molecules 153 so that all the dipole moments (P⊥) 154 may be directed in the electrical field direction. The liquid crystal molecules 153 have an elongated shape and show refractive anisotropy between the long axis and the short axis thereof. Accordingly, it is easily understood that when, for instance, polarizes arranged in a cross nicol relationship i.e. with their polarizing directions being crossing each other are disposed on the upper and the lower surfaces of the glass plates, the liquid crystal cell thus arranged functions as a liquid crystal optical modulation device of which optical characteristics vary depending upon the polarity of an applied voltage.

Figure 16:
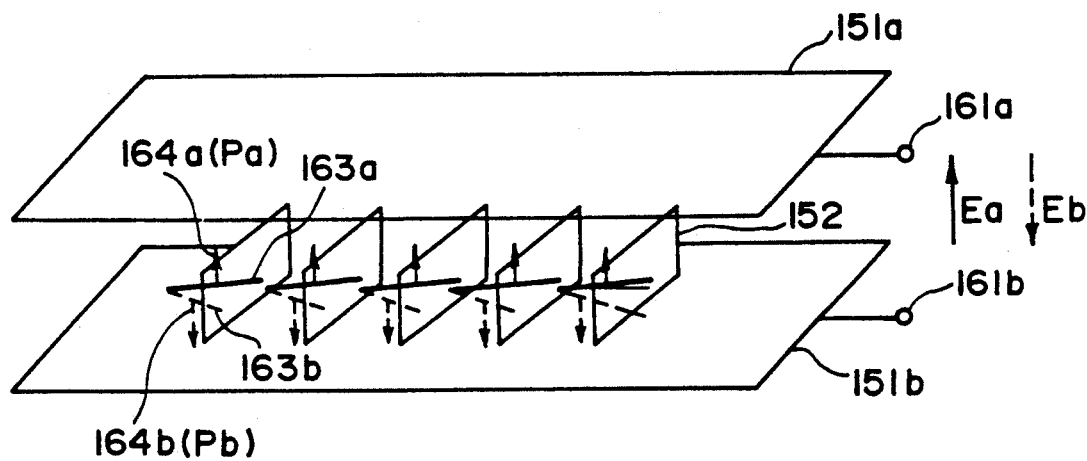
FIG. 16 is a schematic perspective view for illustrating an operation of a surface-stabilized ferroelectric liquid crystal device in a bistable alignment state.

A surface-stabilized-type ferroelectric liquid crystal cell in a bistable alignment state used in the liquid crystal device of the present invention may be made sufficiently thin. As the liquid crystal layer is sufficiently thin (e.g., 0.1–3 microns), the helical structure of the liquid crystal molecules will be unwound even under no application of electrical field to become a nonhelical structure as shown in FIG. 16, whereby its dipole moment assumes either Pa directed upward (164a) or Pb directed downward (164b), thus forming a bistable state. When an electrical field Ea or Eb with different polarity exceeding a certain threshold value is applied to such a cell as shown in FIG. 16, the dipole moment will change its direction upwardly 164a or downwardly 164b corresponding to the electrical field vector Ea or Eb, whereby the liquid crystal molecules become oriented to either one of the first stable state 163a or the second stable state 163b, correspondingly.

Use of such a ferroelectric liquid crystal as the optical modulating device gives principally two advantages. Firstly, the response speed is extremely rapid, and secondly, alignment of the liquid crystal molecules has bistability. To describe about the second point by referring to, for example, FIG. 16, application of an electrical field Ea makes liquid crystal molecules oriented to the first stable state 163a, which is stably retained even if the electrical field is removed. On the other hand, when an electrical field Eb in the opposite direction is applied, the liquid crystal molecules are oriented to the second stable state 163b to change the directions of the molecules, which state is also stably retained even if the electrical field is removed. Also, unless the electrical field Ea or Eb given exceeds a certain threshold value, the respective alignment states are also maintained.

Hereinbelow, the present invention will be explained by way of representative Examples and Comparative Examples.

EXAMPLE 1

Two 1.1 mm-thick glass plates each provided with a 1000 Å-thick ITO film were provided, and each glass plate was further coated with a 3 wt. % solution of an alicyclic polyimide film-forming solution ("SUN-EVER. 150" (trade name), available from Nissan Kagaku Kogyo K. K.) in a 3/1 (wt.) mixture of N-methylpyrrolidone/n-butylcellosolve by means of a spinner coater rotating at 3000 rpm for 30 sec., followed by heating for 1 hour at 250° C. for curing to provide a 500 Å-thick film. The coating film was subjected to rubbing in one direction with an acetate fiber-planted cloth and then washed with isopropyl alcohol, followed by drying at 120° C. for 20 min. On one of the two glass plates thus treated, alumina beads of about 1.5 micron in average diameter were dispersed, and the other glass plate was superposed thereon so that the rubbing axes provided to the two glass plates were parallel with each other and the rubbing directions were identical to each other to form a blank cell.

Into the cell, a ferroelectric smectic liquid crystal "CS-1014" (trade name, available from Chisso K. K.) was injected, and after sealing, aligned by cooling from isotropic phase to 30° C. at a rate of 0.5° C./hour.

The liquid crystal "CS-1014" showed the following phase transition series in the above-prepared cell:

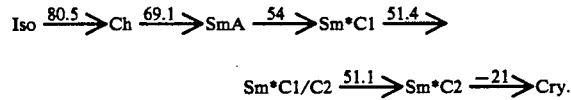

$$\text{Iso} \xrightarrow{80.5} \text{Ch} \xrightarrow{69.1} \text{SmA} \xrightarrow{54} \text{Sm*C1} \xrightarrow{51.4}$$

$$\text{Sm*C1/C2} \xrightarrow{51.1} \text{Sm*C2} \xrightarrow{-21} \text{Cry.}$$

Thus, in the cell, a C2 alignment domain was stably formed in the temperature range of about 50° C. to −20° C. with good monodomain formation characteristic.

The experiments were thereafter carried out at 25° C.

The above-prepared liquid crystal cell was sandwiched between a pair of right-angle cross nicol polarizers and then supplied with a pulse of 50 μsec and 30 V. Then, the right-angle cross nicols were set at the extinction position (to provide the darkest state), and the transmittance of the cell at that time was measured by a photomultiplier. Then, a pulse of 50 μsec and −30 V was applied to the cell to provide a bright state, and the transmittance at that time was measured in the same manner. As a result, the transmittance in the darkest state was 1.0% and the transmittance in the bright state was 8.0%, so that a contrast of 8 was obtained.

The above liquid crystal cell was then subjected to an impact durability test by means of a dropping durability tester ("DT-50" (trade name), mfd. by Yoshida Seiki K. K.). In the test, the dropping impact was increased successively from a minimum value of 20 G (G: gravitational acceleration (=9.8 m/sec$^2$)) by a unit increment of 10 G. As a result, the above liquid crystal cell of this Example caused no alignment disorder even after applying a dropping impact of 80 G and showed a similar switching characteristic as before when supplied with the same driving pulses as those described above.

EXAMPLES 2-6

Ferroelectric smectic liquid crystal cells were prepared in the same manner as in Example 1 except that alignment control film materials and liquid crystal materials shown in the following Table 1 were used.

The respective cells were subjected to the same tests as in Example 1, whereby the contrast and durability data shown in Table 2 were obtained.

TABLE 1

| Example | Alignment control film | Liquid crystal |
|---|---|---|
| 2 | "Sun-Ever 150" (trade name) (Nissan Kagaku Kogyo K.K) | "CS-1011" (trade name) (FLC*, available from Chisso K.K.) |
| 3 | "SE 4110" (trade name) (alicyclic polyimide, available from Nissan Kagaku Kogyo K.K.) | "CS-1014" (trade name) (FLC*, available from Chisso K.K.) |
| 4 | "SE 4110" | "CS-1011" |
| 5 | "JIG-1" (trade name) (alicyclic polyimide, available from Nihon Gosei Gomu K.K.) | "CS-1014" |
| 6 | "LP-64" (trade name) (aromatic polyimide, available from Toray K.K.) | "CS-1014" |

*FLC in the table denotes a ferroelectric smectic liquid crystal.

TABLE 2

| | (at 25° C.) | | | |
|---|---|---|---|---|
| | Transmittance | | Contrast | |
| Example | Darkest state | Bright state | (in memory) state | Impact durability |
| 2 | 0.9(%) | 8.9(%) | 9.9 | Good* |
| 3 | 0.9 | 8.0 | 8.9 | " |
| 4 | 1.0 | 8.5 | 8.5 | " |
| 5 | 1.2 | 8.0 | 6.7 | " |
| 6 | 0.9 | 8.9 | 9.9 | " |

*No deterioration in alignment was observed even after application of an impact of 80 G in the dropping test.

The phase transition series of the respective cells were examined, whereby the results shown in the following Table 3 were obtained.

TABLE 3

| | (Data in the Table are in °C.) | | | | | |
|---|---|---|---|---|---|---|
| Example | Iso→Ch→ | SmA→ | Sm*C1→ | Sm*C1/C2→ | Sm*C2→ | Cry. |
| 2 | 91 | 78 | 55 | 52 | 50 | <0 |
| 3 | 80.5 | 69.1 | 54 | 52 | 51 | −20 |
| 4 | 91 | 78 | 55 | 53 | 51 | <0 |
| 5 | 80.5 | 69.1 | 54 | 52 | 51 | −20 |
| 6 | 80.5 | 69.1 | 54 | 53 | 51 | −20 |

The data in Table 3 show that the Sm*C1-Sm*C1/C2 phase transition temperature and the Sm*C1/C2-Sm*C2 phase transition temperature slightly vary for the respective cells even if the same liquid crystal is used.

The above cells of Examples 1-6 were then respectively supplied with a pulse of 50 μsec and 30 V, followed by setting of the right-angle cross nicols to the extinction position, whereby each cell provided a black state. Then, the respective cells were supplied with a pulse of 50 μsec and −30 V, followed again by setting of the right-angle cross nicols to the extinction position, whereby each cell again provided a black state. All the measurements were effected at 25° C.

COMPARATIVE EXAMPLES 1-5

Ferroelectric smectic liquid crystal cells were prepared in the same manner as in Example 1 except that alignment control film materials and liquid crystal materials shown in the following Table 4 were used.

The respective cells were subjected to the same tests as in Example 1, whereby the contrast and durability data shown in Table 5 were obtained.

TABLE 4

| Comparative Example | Alignment control film | Liquid crystal |
|---|---|---|
| 1 | "SP-710" (trade name) (aromatic polyimide, available from Toray K.K.) | "CS-1017" (trade name) (FLC, available from Chisso K.K.) |
| 2 | "SP-710" | "CS-1018" (trade name) (FLC, available from Chisso K.K.) |
| 3 | "X-419B" (trade name) (polyimide, available from Nitto Denko K.K.) | "CS-1017" |
| 4 | "X-419B" | "CS-1017" |
| 5 | "X-419B" | "CS-1018" |
| 6 | "X-419B" | "CS-1018" |

TABLE 5

| | (at 25 °C.) | | | |
|---|---|---|---|---|
| | Transmittance | | Contrast | |
| Com. Example | Darkest state | Bright state | (in memory state) | Impact durability |
| 1 | 2.3(%) | 7.5(%) | 3.3 | <30G* |
| 2 | 3.0 | 8.0 | 2.7 | <40G* |
| 3 | 3.3 | 8.2 | 2.5 | <30G* |
| 4 | 3.5 | 8.0 | 2.3 | <30G* |
| 5 | 3.2 | 8.2 | 2.6 | <50G* |

*Remarkable alignment disorder occurred when the indicated magnitude of impact was added in the dropping test.

The phase transition series of the respective cells were examined, whereby the results shown in the following Table 6 were obtained.

TABLE 6

| | (Data in the Table are in °C.) | | | | |
|---|---|---|---|---|---|
| Com. Example | Iso→CH→SmA→Sm*C1→Sm*C1/C2→Sm*C2→Cry. | | | | |
| 1 | 66.4 | 62.5 | 52.8 | — | — | <0 |
| 2 | 74.5 | 71.7 | 58 | — | — | <0 |
| 3 | 66.4 | 62.5 | 52.8 | — | — | <0 |
| 4 | 74.5 | 71.7 | 58 | — | — | <0 |
| 5 | 80.5 | 69.1 | 54 | — | — | <0 |

As shown in Table 6, no Comparative Example cells showed a temperature range for yielding an Cm*C2 sub-phase until the temperature reached below 0° C.

The above cells of Comparative Examples 1-5 were then respectively supplied with a pulse of 50 μsec and 30 V, followed by setting of the right-angle across nicols to the extinction position, whereby each cell provided a blue state. Then, the respective cells were supplied with a pulse of 50 μsec and −30 V, followed again by setting of the right-angle cross nicols to the extinction position, whereby each cell again provided a blue state. Thus, these cells of comparative cells all provided different appearances from those of the cells of Examples 1-6 in the two extinction states, thus showing differences in alignment state. All the measurements were effected at 25° C.

COMPARATIVE EXAMPLE 6

A ferroelectric smectic liquid crystal cell was prepared in the same manner as in Example 1 except that a pair of substrates treated in the same manner as in Example 1 were fixed to each other so that the rubbing axes provided to the two substrates were parallel with each other and reverse in direction. The liquid crystal cell was subjected to the same tests as in Example 1, whereby results shown in the following Table 7 were obtained.

TABLE 7

| | (at 25°C.) | | | |
|---|---|---|---|---|
| | Transmittance | | Contrast | |
| Com. Example | Darkest state | Bright state | (in memory state) | Impact durability |
| 6 | 1.9% | 9.2% | 4.8 | <20G* |

*Remarkable alignment disorder occurred when an impact of 20G was applied in the dropping test.

The above cell of Comparative Example 6 was supplied with a pulse of 50 μsec and 30 V, followed by setting of the right-angle cross nicols to the extinction position, whereby the cell showed a black state. Then, the cell was supplied with a pulse of 50 μsec and −30 V, followed again by setting of the right-angle cross nicols to the extinction position, whereby the cell showed a blue state at this time (at 25° C.). Thus, the cell showed a difference in appearance from the cells of Examples 1-6 in the two extinction states, thus showing a difference in alignment state.

Most of the alignment disorders caused in the cells of Comparative Examples 1-6 were in sanded texture, and the liquid crystal cells thereafter failed to cause switching by application of pulses of 50 μsec and 30 V or −30 V.

Further, the cells of Examples 1 and 2 were subjected to measurement of the pretilt angle θpr in the smectic A phase. The results are shown in the following Table 8.

TABLE 8

| Example | Pretilt angle |
|---|---|
| 1 | 4.6 degrees |
| 2 | 2.6 degrees |

As is understood from the above Examples and Comparative Examples, the present invention provides a ferroelectric smectic liquid crystal device having an improved impact stability and providing a display of an improved contrast.

What is claimed is:

1. A process for preparing a chiral smectic liquid crystal device, comprising the steps of:
    (a) providing a pair of substrates, each having a uniaxial alignment axis, said uniaxial alignment axes being parallel and identical in direction with each other;
    (b) disposing between the pair of substrates a chiral smectic liquid crystal capable of forming a higher-temperature alignment state and a lower-temperature alignment state in its chiral smectic phase; and
    (c) cooling the chiral smectic liquid crystal from a phase having a temperature higher than the chiral smectic phase to place the chiral smectic liquid crystal first in the higher-temperature alignment state and then further cooling the chiral smectic liquid crystal to place the liquid crystal in the lower-temperature alignment state in the chiral smectic phase in a bistable alignment state providing two stable orientation states.

2. A process according to claim 1, wherein said lower-temperature alignment state occurs at a temperature of at least 30° C. in the course of cooling the chiral smectic liquid crystal, wherein said further cooling step further comprises the step of further cooling the chiral smectic liquid crystal to a temperature of at least 30° C.

3. A process according to claim 1, wherein said lower-temperature alignment state occurs at a temperature of at least 40° C. in the course of cooling the chiral smectic liquid crystal, wherein said further cooling step further comprises the step of further cooling the chiral smectic liquid crystal to a temperature of at least 40° C.

4. A process for preparing a chiral smectic liquid crystal device, comprising the steps of:
   (a) providing a pair of substrates, each having a uniaxial alignment axis, said uniaxial alignment axes being parallel and identical in direction with each other;
   (b) disposing a chiral smectic liquid crystal between the pair of substrates; and
   (c) cooling the chiral smectic liquid crystal from a phase having a temperature higher than the chiral smectic phase to place the chiral smectic liquid crystal in a bistable first aligment state providing two stable orientation states in which a connected pair of a hairpin defect and a lightning defect are formed where the hairpin defect is formed after the lightning defect in the uniaxial alignment axis direction.

5. A process according to claim 4, wherein said cooling step comprises the step of cooling the chiral smectic liquid crystal such that the first alignment state and another alignment state exist in the chiral smectic liquid crystal and wherein a first alignment state domain occupies a major proportion of the chiral smectic liquid crystal and a domain of the another alignment state occupies a minor proportion of the chiral smectic liquid crystal.

6. A process according to claim 5, wherein said cooling step further comprises the step of cooling the chiral smectic liquid crystal such that said first alignment state domain is grown to occupy a major proportion of the chiral smectic liquid crystal until said another alignment state occupies only a minor proportion of the chiral smectic liquid crystal.

7. A process according to claim 6, wherein the temperature range where said another alignment state domain occupies not a minor proportion of the chiral smectic liquid crystal is 1/5 or less of the temperature range where said another alignment state domain occupies a minor proportion of the chiral smectic liquid crystal during cooling of the chiral smectic liquid crystal, wherein said cooling step further comprises the step of cooling the chiral smectic liquid crystal to a temperature at least five times the temperature at which said another alignment state domain occupies not a minor proportion of the chiral smectic liquid crystal.

8. A process according to claim 6, wherein the temperature range where said another alignment state domain occupies not a minor proportion of the chiral smectic liquid crystal is 1/10 or less of the temperature range where said another alignment state domain occupies a minor proportion of the chiral smectic liquid crystal during cooling of the chiral smectic liquid crystal, wherein said cooling step further comprises the step of cooling the chiral smectic liquid crystal to a temperature at least ten times the temperature at which said another alignment state domain occupies not a minor proportion of the chiral smectic liquid crystal.

9. A process according to claim 6, wherein the temperature range where said another alignment state domain occupies not a minor proportion of the chiral smectic liquid crystal is 1/20 or less of the temperature range where said another alignment state domain occupies a minor proportion of the chiral smectic liquid crystal during cooling of the chiral smectic liquid crystal, wherein said cooling step further comprises the step of cooling the chiral smectic liquid crystal to a temperature at least twenty times the temperature at which said another alignment state domain occupies not a minor proportion of the chiral smectic liquid crystal.

10. A process according to claim 6, wherein said cooling step comprises the step of cooling the chiral smectic liquid crystal such that the lower limit of a temperature range where said another alignment state domain occupies not a minor proportion of the chiral smectic liquid crystal is 30° C. during cooling of the chiral smectic liquid crystal.

11. A process according to claim 6, wherein said step comprises the step of cooling the chiral smectic liquid crystal such that lower limit of a temperature range where said another alignment state domain occupies not a minor proportion of the chiral smectic liquid crystal is 40° C. during cooling of the chiral smectic liquid crystal.

12. A process according to claim 5, wherein the providing and disposing steps form a liquid crystal cell comprising the pair of substrates and the chiral smectic liquid crystal, said method further comprising the steps of sealing the cell with a sealing member, forming the domain of said another alignment state in a neighborhood region of the sealing member of the cell, and forming the domain of said first alignment state inside the neighborhood region.

13. A process according to claim 5, further comprising the step of forming a connected pair of a hairpin defect and a lightning defect in the chiral smectic liquid crystal in said another alignment state, wherein the lightning defect is formed after the hairpin defect in the uniaxial alignment axis direction.

14. A process according to claim 4, wherein said cooling step further comprises the step of cooling the chiral smectic liquid crystal to place the chiral smectic liquid crystal in the bistable first alignment state such that the two stable orientation states in the domain in said first alignment state are optically equivalent, respectively, in an extinction position.

15. A process according to claim 4, further comprising the step of providing an alignment control film on one of the substrates and imparting a uniaxial alignment axis to the alignment control film.

16. A process according to claim 15, wherein said alignment control film comprises a polyimide film, a polyamide film, or a polyester film.

17. A process according to claim 15, wherein said alignment control film comprises a polyimide film.

18. A process according to claim 15, further comprising the step of providing an insulating film on one of the substrates and forming the alignment control film on the insulating film.

19. A process according to claim 4, wherein said uniaxial alignment axis is a rubbing axis.

20. A process for preparing a chiral smectic liquid crystal device, comprising the steps of:

(a) providing a pair of substrates, each having a uniaxial alignment axis, said uniaxial alignment axes being parallel and identical in direction with each other;
(b) disposing between the pair of substrate a chiral smectic liquid crystal assuming a chiral smectic phase and assuming a smectic A phase at a higher temperature than the chiral smectic phase; and
(c) cooling the chiral smectic liquid crystal so that the chiral smectic liquid crystal first assumes the smectic A phase and then assumes the chiral smectic phase so that the liquid crystal molecules are aligned to form a pre-tilt angle of at least 2 degrees with respect to a substrate face at a temperature in the range in which the chiral smectic liquid crystal assumes the smectic A phase.

21. A process according to claim 20, wherein said pre-tilt angle is at least 3 degrees.

22. A process according to claim 20, further comprising the step of providing an alignment control film on one of the substrates and imparting a uniaxial alignment axis to the alignment control film.

23. A process according to claim 22, wherein said alignment control film comprises a polyimide film.

24. A process according to claim 22, further comprising the step of providing an insulating film on one of the substrates and forming the alignment control film on the insulating film.

25. A process according to claim 20, wherein said uniaxial alignment axis is a rubbing axis.

* * * * *

UNITED STATES PATENT AND TRADEMARK OFFICE
CERTIFICATE OF CORRECTION

PATENT NO. : 5,200,848
DATED : April 6, 1993
INVENTOR(S) : YUKIO HANYU, ET AL.

It is certified that error appears in the above-indentified patent and that said Letters Patent is hereby corrected as shown below:

COLUMN 2

Line 16, "an" should be deleted.

COLUMN 3

Line 20, "projections" should read --projection--.

COLUMN 4

Line 25, "C1 alignment" should read --C1 alignment state--.
Line 37, "shows" should read --show--.

COLUMN 5

Line 54, "shown in FIGS. 3-5)" should be deleted.

COLUMN 6

Line 17, "domain." should read --domain 74.--.
Line 24, "angle." should read --angle $\theta_B$--.
Line 59, "states 14a" should read --films 14a--.

COLUMN 7

Line 15, "alignments" should read --alignment--.
Line 40, "optical" should read --optically--.
Line 44, ")" should be deleted.
Line 52, "shiftly" should read --slightly--.
Line 68, "c1 alignment" should read --C1 alignment--.

UNITED STATES PATENT AND TRADEMARK OFFICE
CERTIFICATE OF CORRECTION

PATENT NO. : 5,200,848
DATED : April 6, 1993
INVENTOR(S) : YUKIO HANYU, ET AL.

It is certified that error appears in the above-indentified patent and that said Letters Patent is hereby corrected as shown below:

COLUMN 8

Line 29, "defect" should read --defect 121--.

COLUMN 9

Line 4, "axis direction" should read --direction. When the--.
Line 6, "until the" should read --, the--.

COLUMN 10

Line 25, "polarizes" should read --polarizers-- and "relationship" should read --relationship,--.
Line 26, "being" should be deleted.

COLUMN 13

Line 50, "an Cm*C2" should read --a Sm*C2--.

COLUMN 15

Line 27, "formed where" should read --formed, where--.

COLUMN 16

Line 22, "said step" should read --said cooling step--.
Line 24, "lower" should read --the lower--.

UNITED STATES PATENT AND TRADEMARK OFFICE
CERTIFICATE OF CORRECTION

PATENT NO. : 5,200,848
DATED : April 6, 1993
INVENTOR(S) : YUKIO HANYU, ET AL.

It is certified that error appears in the above-indentified patent and that said Letters Patent is hereby corrected as shown below:

<u>COLUMN 17</u>

Line 6, "substrate" should read --substrates--.

Signed and Sealed this

Tenth Day of May, 1994

*Attest:*

BRUCE LEHMAN

*Attesting Officer*   *Commissioner of Patents and Trademarks*